(12) United States Patent
Moia

(10) Patent No.: US 6,806,930 B2
(45) Date of Patent: Oct. 19, 2004

(54) OPTICAL SECURITY DEVICE

(75) Inventor: Franco Moia, Frenkendorf (CH)

(73) Assignee: Rolic AG, Zug (CH)

( * ) Notice: Subject to any disclaimer, the term of this patent is extended or adjusted under 35 U.S.C. 154(b) by 0 days.

(21) Appl. No.: 10/182,150

(22) PCT Filed: Jan. 25, 2001

(86) PCT No.: PCT/CH01/00058
§ 371 (c)(1),
(2), (4) Date: Jul. 26, 2002

(87) PCT Pub. No.: WO01/55960
PCT Pub. Date: Aug. 2, 2001

(65) Prior Publication Data
US 2003/0035191 A1 Feb. 20, 2003

(30) Foreign Application Priority Data
Jan. 27, 2000 (EP) .......................................... 003006103

(51) Int. Cl.[7] .......................... G02F 1/1335; G02B 5/32
(52) U.S. Cl. ............................. 349/117; 359/15; 359/2; 349/127; 349/129
(58) Field of Search .......................... 349/98, 129, 113, 349/127; 359/73, 15, 2

(56) References Cited

U.S. PATENT DOCUMENTS 5,548,427 A * 8/1996 May ............................ 349/117
5,903,330 A * 5/1999 Funfschilling et al. ...... 349/129
6,144,428 A   11/2000 Schadt et al. ................ 349/113
6,160,597 A * 12/2000 Schadt et al. .................. 349/98
6,496,287 B1 * 12/2002 Seiberle et al. ............... 359/15

FOREIGN PATENT DOCUMENTS

| EP | 0 689 065 | 12/1995 |
| EP | 0 899 119 | 3/1999 |
| EP | 0 911 758 | 4/1999 |
| WO | WO 98 52077 | 11/1998 |
| WO | WO 00 29878 | 5/2000 |

* cited by examiner

Primary Examiner—Thien M. Le
Assistant Examiner—Daniel A. Hess
(74) Attorney, Agent, or Firm—Finnegan, Henderson, Farabow, Garrett, & Dunner, L.L.P.

(57) ABSTRACT

In order to provide comprehensive and multi-purpose security, an optical security device is provided that comprises a substrate and at least a first optically structured layer. The optical security device may provide first, second and third optical inspection levels, including a first inspection level where an optical effect can be discerned with the naked eye, a second level in which an object can be discerned with the aid of an optical inspection tool, and a third level in which an encrypted object can be discerned with a decrypting optical inspection tool. The first layer may be constructed as a retarder plate of LCP material, having an array of elemental areas with different predetermined orientations.

22 Claims, 8 Drawing Sheets

Fig. 1a and 1b: Appearance of an Example of a 1st, 2nd and 3rd level cholesteric LPP/LCP Security Device
Fig. 1a: 'Positive mode' (polarizer +45° to the x-axis)
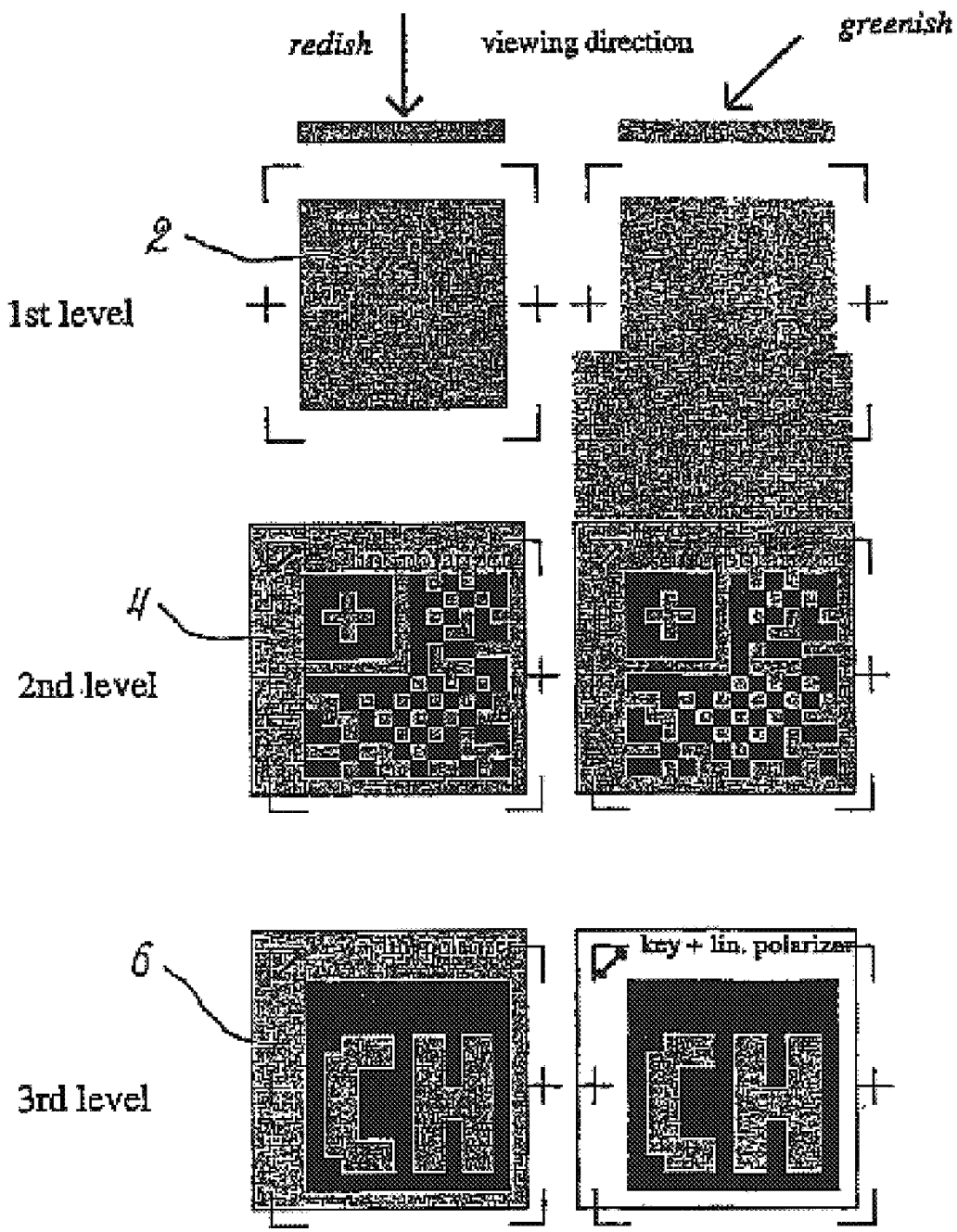

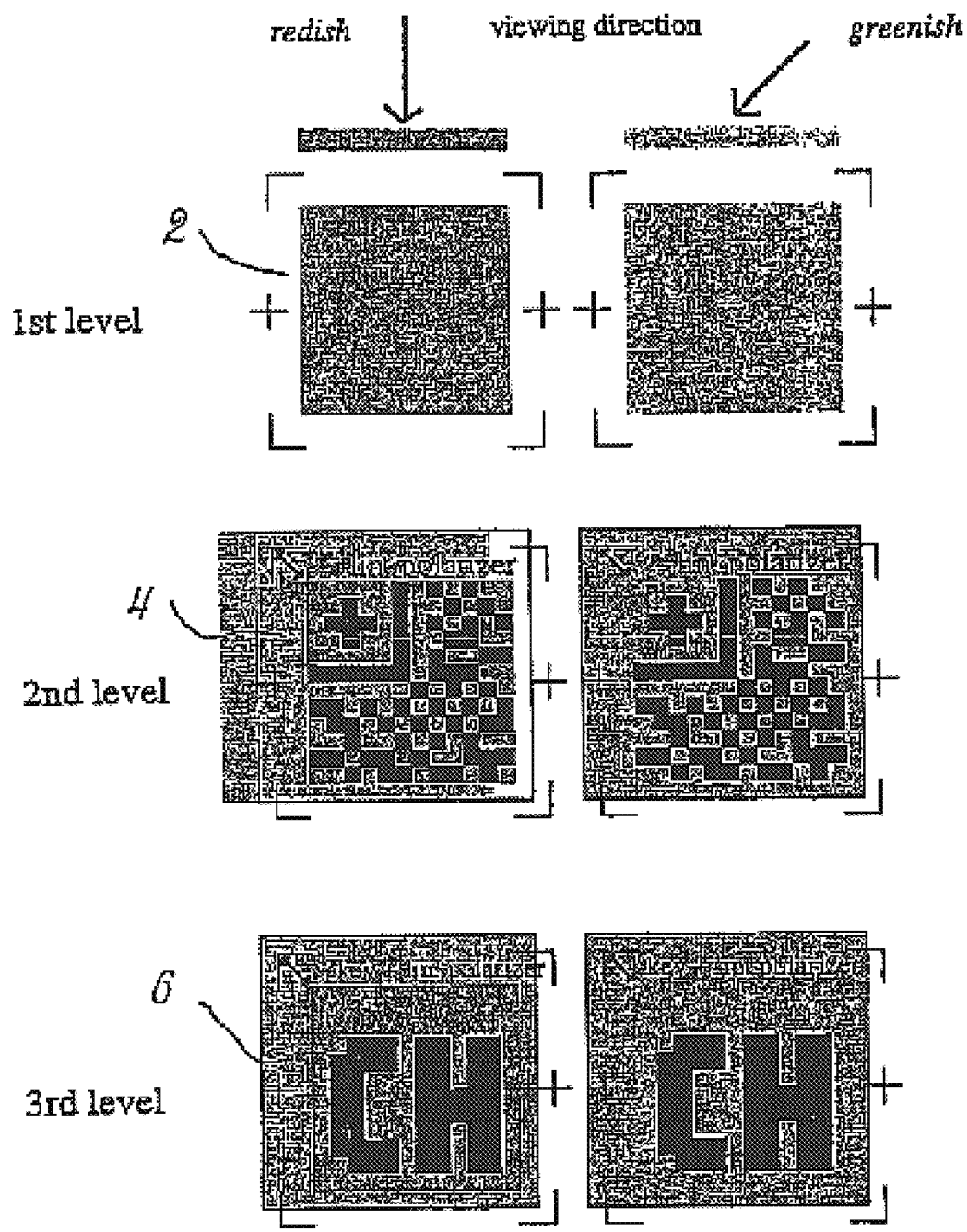

Fig. 2a,b and c: Schematic view of the "Optical device" together with the inspection tools for 1st, 2nd and 3rd level
Fig. 2a: 3rd level inspection mode
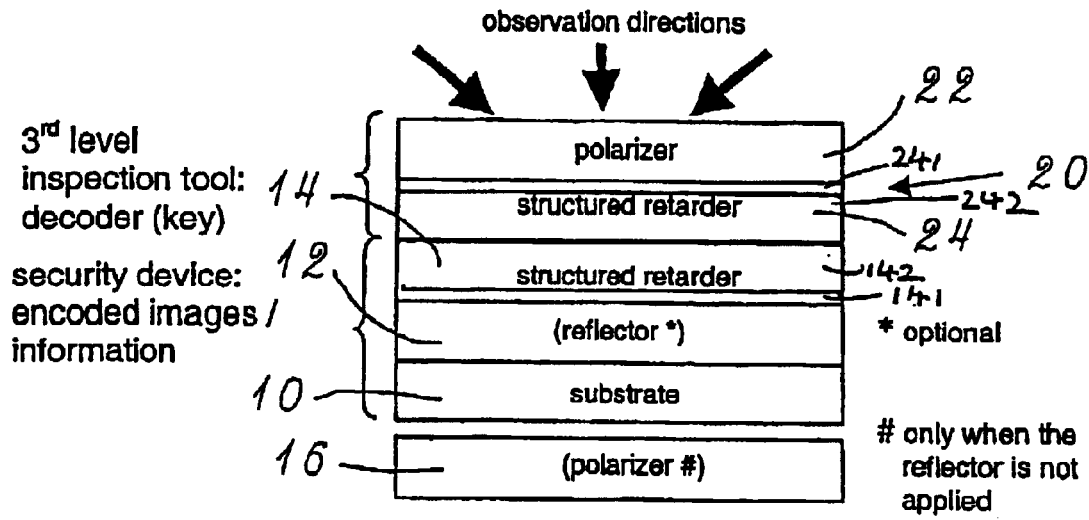
Fig. 2b: 2nd level inspection mode
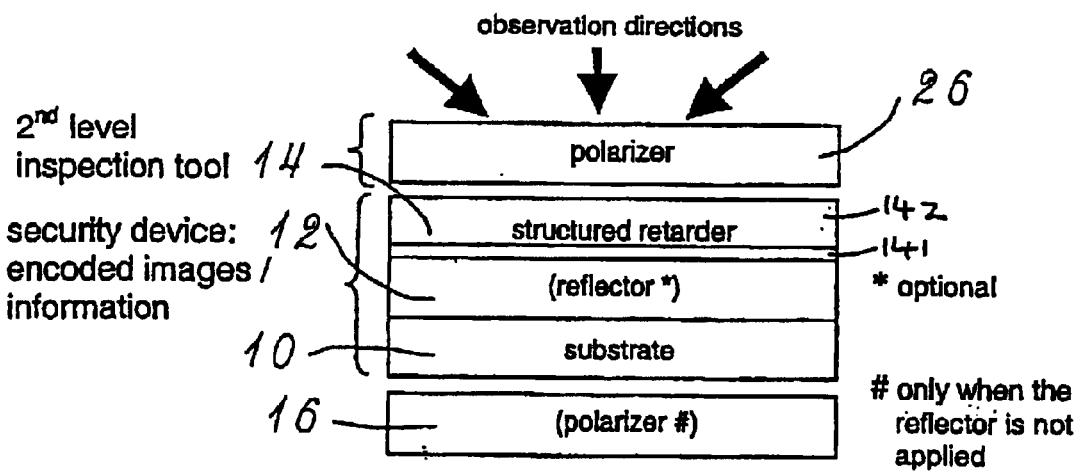
Fig. 2c: 1st level inspection mode by tilting the security device
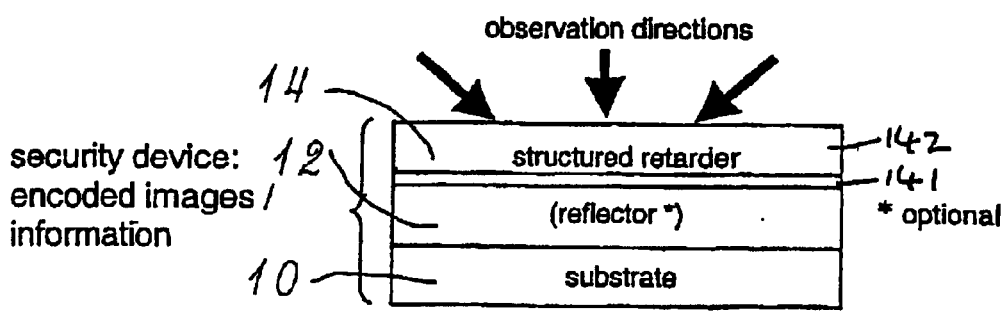

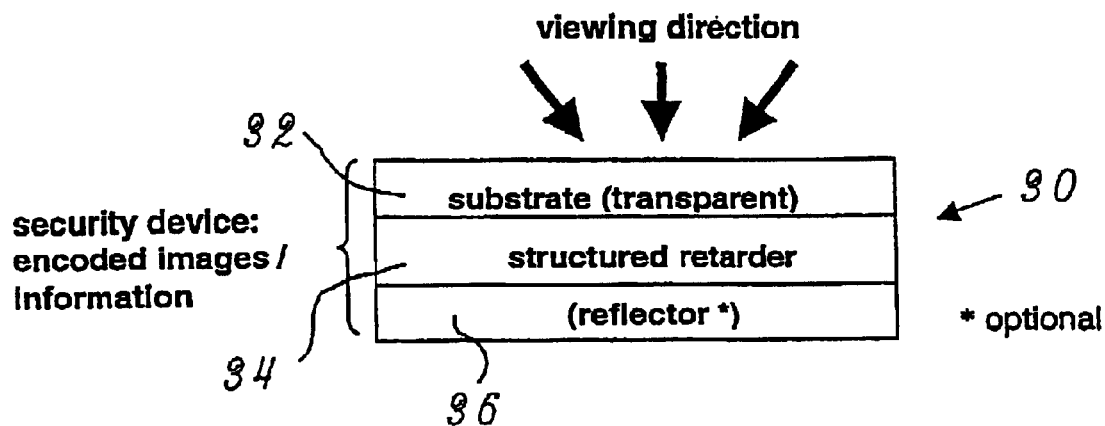
Fig. 3: Alternative schematic view of the "Optical device" (inverse layer order e.g. for transfer foils or similar substrates); only the security device without inspection tools is depicted

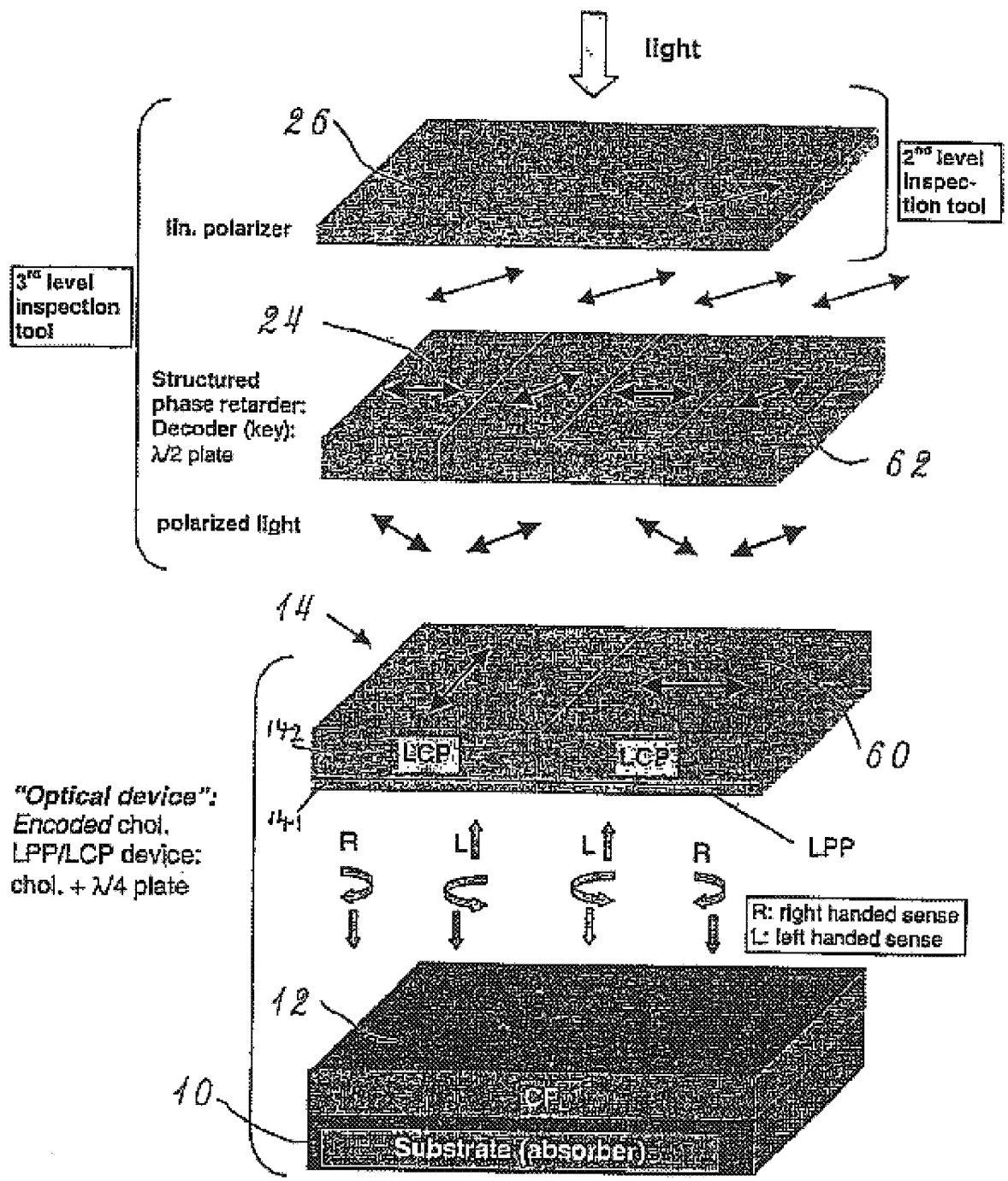
Fig. 4: 3rd level LPP/LCP Security Device: Cholesteric type

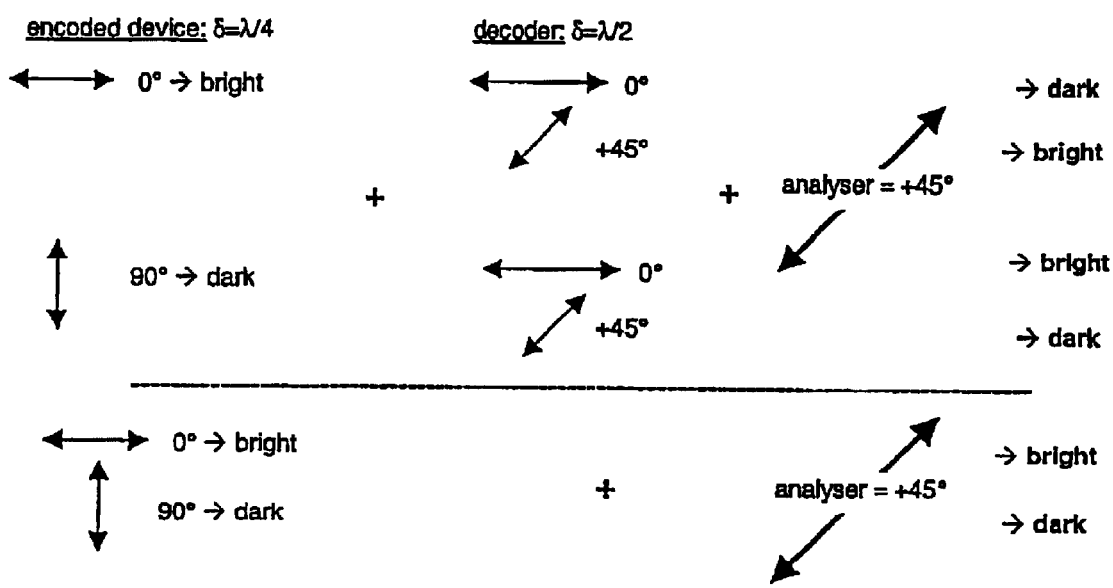
Fig. 5: Some typical retarder configuration for the encoded device and decoding device (cholesteric type) (cholesteric type)

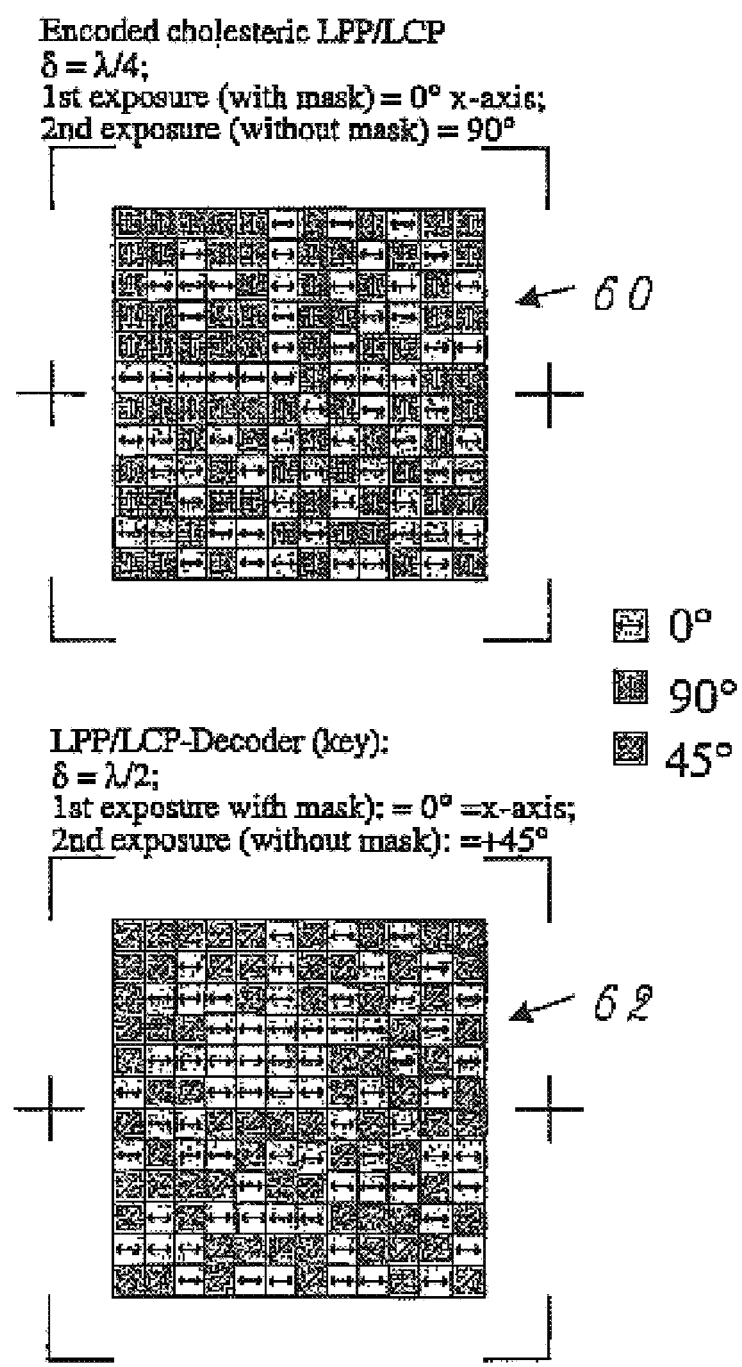
Fig. 6: Schematically representation of the geometry of an encoded LPP/LCP Device and its corresponding decoder (example)

Fig. 7: Masks for the manufacturing of an "Optical device" (example)

Masks for encoded 3rd level chol. LPP/LCP Security

Mask: Chol. LPP/LCP device (encoded): retardation $\delta = \lambda/4$
1st exposure (with mask) = 0° = x-axis; 2nd exposure (without mask) = 90°

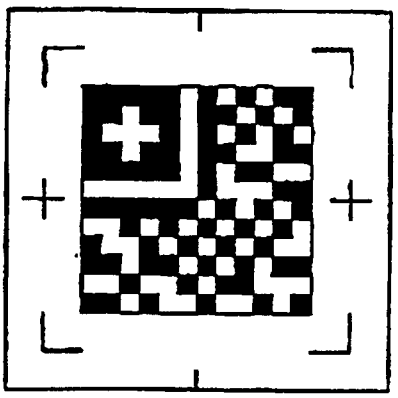
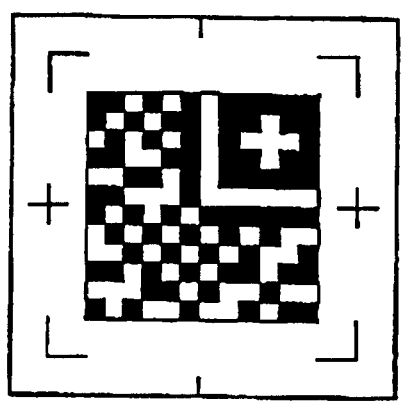

for reverse configuration:
1. LPP - 2. LCP - 3. CF
(also reverse view: substrate first, then LPP, then LCP, then CF)

for normal configuration:
1. CF - 2. LPP - 3. LCP
(normal view: LCP first, then LPP, then, CF, then Mask LPP/LCP-Decoder (key): retardation $\delta = \lambda/2$;
1st exposure (with mask): = 0° = x-axis; 2nd exposure (without mask): = +45°

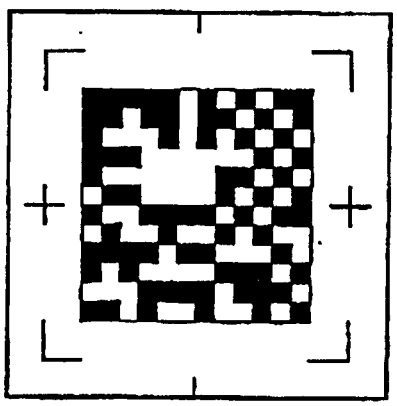
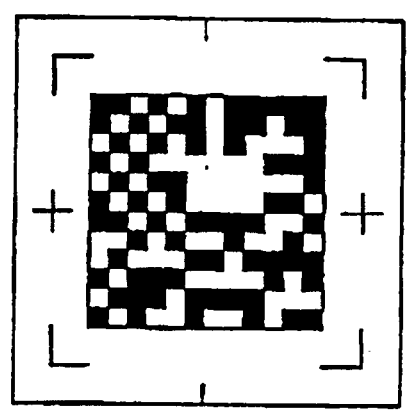

OPTICAL SECURITY DEVICE

This application claims priority to EPO 003006103 filed Jan. 27, 2000.

This invention relates to an optical security device for applying to or incorporating in commercial items. Such items are found principally in the fields of document security (banknote, stamp, card and tickets applications), brand protection (pharmaceuticals, flavours, liquors), secure packaging of articles, software, spare parts for vehicles, etc., or packaging therefor; however the invention is not limited to such fields.

Optical security devices are commonly used for authenticating articles to which they are applied. A first type of such device comprises holograms, kinograms, watermarks, micro-perforations, optical variable inks, etc. Such devices can be inspected with the naked eye (first level inspection) and provide an authentication, having regard to the difficulty a counterfeiter would have in providing a similar device; such security devices will be referred to herein as "first level" security devices.

A second type of such security device provides a greater degree of security or authentication than the first type and is viewable with a cheap and easily available tool, for example, a polariser sheet, a magnifying glass, a black lamp (UV), etc (second level inspection). Examples of such security elements are micro-printing devices, fluorescent inks, and devices based on polarisation effects as disclosed in our earlier application WO 98/52077. Application WO 98/52077 discloses devices based on photo-oriented polymer network (PPN) layer, which is disposed on a substrate and is selectively oriented in different directions in different local regions over its surface. The PPN layer is covered by a layer of cross-linked liquid-crystal monomers; this layer, which is optically anisotropic and exhibits birefringence provides an optical retarder layer. The liquid crystal nature of the retarder layer follows the selective orientation of the PPN layer to enable the manufacturing of phase retarder images which may be seen with the aid of polariser sheets. Such security devices will be referred to herein as "second level" security devices.

A third type of security device comprises elements which can be visualised or detected only with special, expensive tools such as photo-spectrometers, polarising microscopes, etc. (third level inspection). In addition, electronic techniques are known for inserting, and subsequently identifying, watermarks in an image or totally encrypting an image. Further examples for such security devices are elements made with special fluorescent inks, digital scrambled indicia. All these devices have in common that they can only be received with special decrypting tools, and will be referred to herein as "third level" security devices.

The concept of the present invention is to provide a new optical security device which exhibits third level security levels and combines, if desired, in a single device all three first, second and third levels of security.

In a first aspect, the invention provides an optical authentication device in combination with an inspection tool, wherein the authentication device comprises at least a first layer of optically anisotropic material which is selectively oriented in different orientations over its area such as to encrypt an object therein; and wherein the inspection tool includes a further layer of optically anisotropic material which is selectively oriented in different orientations over its area for decrypting the object such that the object can be viewed when the authentication device is viewed through the inspection tool.

In a second aspect, the invention provides an optical authentication device in combination with an inspection tool, wherein the authentication device comprises at least a first layer of optically anisotropic material which is selectively oriented in different orientations over its area such as to encrypt an object therein; and wherein the inspection tool is such as to provide a light path or light beam having an optical parameter non-uniform over its width such as to co-operate with said optical anisotropic material to enable viewing of the encrypted object.

In a third aspect, the invention provides an optical authentication device comprising at least a first layer of optically anisotropic material, which is structured to provide first, second and third optical inspection levels, namely a first inspection level where an optical effect can be discerned with the naked eye, a second level in which a disguised object can be discerned with the aid of an optical inspection tool, and a third level in which an encrypted object can be discerned with a decrypting optical inspection tool.

For the purposes of this specification, "object" is used in the sense of an object which may be viewed optically and forms an image in the eye. Such object will usually be a simple recognisable object such as a pattern or design, or alphanumeric characters, digits etc. representing a code. Thus the object essentially carries information which can be discerned visually. In accordance with the invention, the encrypted object provides a first predetermined item of information, and the disguised object provides a second predetermined item of information, different from the first.

As preferred, said first layer of optically anisotropic material comprises a structured arrangement of phase retarding elements, preferably comprising adjacent elemental areas which are selectively phase retarded relative to one another. The resulting viewable objects created by such a phase retarder depends on the polarisation directions and spectral wavelength distribution of the in and out-coming light. A disguised object can be viewed with sheet polariser (s). When viewed with a decrypting optical tool, an encrypted object can be viewed.

As preferred, the first layer comprises a Liquid Crystal Polymer (LCP) layer, which preferably can be aligned and structured/patterned by a further layer of linear photopolymer (LPP)—synonymous with photooriented polymer network (PPN).

The first layer may be of a structurally-self-supporting material. Alternatively a substrate may be provided mounting the first layer.

The first inspection level which may be optional, is preferably provided by a layer, which gives the reflected light a particular property caused by an optical effect such as diffraction, refraction, wavelength selective reflection, etc. Where the layer comprises cholesteric material (which may be additional to the first layer) the in-coming light is selectively reflected with a wavelength dependent on viewing angle. Within a selective wavelength band the reflected light is circularly polarised, the transmitted light is also circularly polarised but in the opposite helical sense. Outside the selective wavelength band the polarisation state of the light remains unchanged. By tilting the cholesteric layer a colour shift can be perceived with the naked eye e.g. from red to green or from green to blue.

The second and third inspection levels is provided by LCP material forming a first layer. The LCP material form a structured phase retarder layer. Adjacent areas of the structured LCP retarder layer show from one area to the other at least two different orientations of their optical axes into which at least an encrypted and optionally at least a non-encrypted hidden image is stored. The non-encrypted hidden information/images or objects—if present—can be visualised with a normal sheet polariser (second inspection level). The encrypted images can be discerned with a decrypting optical tool as mentioned above (third inspection level).

In accordance with a preferred form of the invention an optical authentication device comprises a substrate, and at least an encrypted, preferably photo-oriented LCP layer which provides third level security. Such a third level device can be discerned with a decrypting optical polarising inspection tool which consists of decrypting LCP layer and therefore can be considered also as a security device. Such an optical authentication device may enable a combined usage for second and third level inspection: visualisation of the second level features can be done with simple polariser sheets. Such a device can provide first, second and third level security and enables a combined usage of such a device for first, second and third level inspection: by tilting the device a colour shift (e.g. from red to green, or from green to blue) can be discerned (first level inspection), the second level features can be visualised with a cheap polariser sheet and the third level features can be discerned with a decrypting optical polarising inspection tool.

In accordance with the invention a security device which provides the combination of first and third level security only is also feasible: the security device consists of substrate, and at least an encrypted structured LCP layer. By tilting the device a colour shift (e.g. from red to green or from green to blue) is observed which corresponds to first level security, the third level features can be discerned with a decrypting optical polarising inspection tool.

BRIEF DESCRIPTION OF THE DRAWINGS

A preferred embodiment of the invention will now be described with reference to the accompanying drawings, wherein:

FIGS. 1a and 1b are schematic views of the appearance of a preferred optical authentication device of the invention;

FIGS. 2a to 2c are schematic sectional views of the preferred device with appropriate inspection tools for viewing the various levels;

FIG. 3 is a schematic sectional view of a modified form of the preferred device;

FIG. 4 is a schematic view of the preferred device, with appropriate inspection tools, showing polarisation states and optical retarder axes;

FIG. 5 is a diagram showing polarisation states and optical retarder axes of the preferred device and inspection tool;

FIG. 6 is a plan view of an encrypted layer of the preferred device, and the counterpart decrypting layer of the inspection tool; and FIG. 7 is plan view of manufacturing masks for the preferred device and inspection tool.

DESCRIPTION OF THE PREFERRED EMBODIMENT

Referring to the drawings, the appearance of the preferred optical security or authentication device, combining $1^{st}$, $2^{nd}$ and $3^{rd}$ levels of inspection is shown in FIG. 1a and FIG. 1b. In the $1^{st}$ level, a viewing angle dependency of the colour of the whole area 2 (forming the object to be viewed) is present, reddish when seen from above and greenish when seen from a lateral direction caused by selective reflection at the cholesteric layer. For the $2^{nd}$ level, a linear polariser is used and a corresponding object 4—in addition to a "randomised" distribution of patterns, the cross in the upper left corner—can be seen; the colour is still dependent on the viewing direction. For the $3^{rd}$ level, an appropriately structured optical phase retarder plate, the decrypter or key, is placed between the linear polariser and the optical device and a second, otherwise encrypted object 6—a "CH"—becomes visible: again the colour is still dependent on the view direction. Rotation of the linear polariser by 90° changes the optical appearance of the various images from positive to negative which is depicted in FIG. 1b.

Referring to FIG. 2, the device comprises sequential layers, substrate 10 of glass, plastic, paper or metal, a cholesteric layer or metallic layer 12 as reflector, a patterned (structured) LPP/LCP layer 14. In case that a metallic reflector is required and the substrate is already metallic then the metallic reflector 12 may be omitted.

In a modification, reflector layer 12 may be omitted, and a polariser layer 16 is included.

As shown in FIG. 2a, a decrypting inspection tool 20 for viewing a third level encrypted object comprises a polarising sheet 22 and a structured retarder plate 24, described in more detail below. In FIG. 2b a polariser sheet 26 corresponds to an inspection tool for viewing a second level object. FIG. 2c depicts the optical security device without any additional inspection tools. The first level aspect can be discerned with the naked eye by tilting the device or by viewing the device obliquely.

The modified optical security device 30 of FIG. 3 has a transparent substrate 32 disposed on the top of the device, a patterned (structured) retarder or LPP/LCP layer 34 and a cholesteric layer 36 as reflector. For transmissive optical security devices 30 the reflector 36 is omitted. This modified configuration 30 is especially useful for the manufacturing of the device on transfer foils (blocking foils), which subsequently will be transferred by a hot stamping process to the final substrate.

A specific first example of the embodiment of FIGS. 1 and 2 is formed as follows:

In a first step, a cholesteric LCP material is spin-coated (other coating or printing techniques are also applicable) onto the substrate 10 to form a layer 12. The cholesteric LCP layer 12 consists of a nematic liquid crystal layer which exhibits a helical twist configuration. The distance for a full 360 degrees turn determines the pitch p. Cholesteric filters exhibit selective reflection within a well-defined adjustable wavelength band and at the same time circularly polarise the light within the band. Thus, it is possible to combine colour filter, polariser and reflector in a single cholesteric LCP layer. Within the selective reflection band, the circularly polarised component of incident light, which exhibits the same twisting sense as the cholesteric helix is—in case that the thickness of the cholesteric layer is sufficiently thick, that means more than about 10 times the pitch p—totally reflected, whereas the opposite circularly polarisation is transmitted without attenuation. Outside of the selective reflection band the filter is fully transmissive and non-polarising. The cholesteric LCP layer of this preferred embodiment has a reflective wavelength band in the visible range, though for special applications the reflective wavelength band could also be in the IR or UV range. In case of the visible range, preferably the band is between 400 nm and 800 nm, more preferably between 450 nm and 650 nm. The cholesteric LCP material consists of a LCP mixture doped with dopant material which induces the necessary pitch for forming the desired reflective wavelength range. As said above the helical sense of the cholesteric LCP layer can be left or right handed. In the example, left-handed material has been used. Again, to achieve an excellent brightness the thickness of the cholesteric layer is around 10 times the pitch.

Depending on the background colour and the (printed) structure of the substrate as well as on the transparency effect that should be achieved, the thickness of the cholesteric layer can also be less than 10 times the pitch in order to produce best image quality results when the device is used as an overlay to protect printed or other information from tampering and alteration. In this case the device not only is used as a separate security device but also as security device in combination with protecting functions of the images and/or information printed or applied onto the substrate.

Thus, the thickness of the cholesteric layer varies from 1 to 10 microns, more preferably from 2 to 8 microns, depending on the cholesteric LCP material which is used and on the transparency effect that is to be achieved. The cholesteric layer is exposed to non-polarised (isotropic) UV light of suitable wavelength to be cross-linked.

Onto the cholesteric layer 12, an orientable linearly photopolymerisable (LPP) layer 141 is spin-coated (other printing or coating techniques are also applicable). Suitable LPP materials, such as cinnamic acid derivatives or ferulic acid derivatives, are e.g. illustrated in patent publications EP-A-611786, WO 96/10049 and EP-A-763552.

This LPP layer with a thickness of about 50 nm is exposed through a photo mask to linearly polarised UV light of suitable wavelength. By using different polarisation directions, for instance 0° and 90° (0° means parallel to one edge of the substrate), for different areas (pixels) (60), an orientation pattern is created (cf FIG. 6, upper pattern), which contains an encrypted object or image, if required combined with non-encrypted object or image.

This enables the storage of images and/or other information into the LPP layer in encrypted combined with non-encrypted modes. Encryption means a specific LPP—and therefore also LCP—patterning selection with a given orientation of each area (pixel) of the pattern such that without an additional superimposed LPP/LCP decoder layer the primary hidden picture information is not perceivable or not understandable respectively. The LCP layer is applied in a further step onto the LPP layer and is explained in more details below.

Also, a more complex orientation pattern of the structured phase retarder of the encrypting device could be used for the encryption. Other angles, that means a plurality of polarisation directions (e.g. 0°, 15°, 30°, 45°, 60°, 75° and 90°) would in particular be easily possible, if an appropriate structured LPP/LCP layer is used instead of a conventional photo masks. Such an LPP/LCP master patterns the incident polarised UV light into areas with different polarisation directions as e.g. 0°, 15°, 30°, 45°, 60°, 75° and 90°, so that a whole pattern of different polarisation directions can be applied in one single exposure step.

If for the exposure of the LPP layer an LPP/LCP master is applied, the encryption level can be increased considerably with only one exposure step, which means that an increase of the pattern complexity of the structured retarder combined with an easier, faster and cheaper manufacturing process is achieved. The security of such a device is then extremely high and can be hardly counterfeited.

Finally, the oriented LPP layer is coated with a cross-linkable liquid crystal monomer or pre-polymer mixture (LCP) 142, which shows birefringence. Such LCP mixture $M_{LCP}$ is described in more detail later. $M_{LCP}$ has an optical anisotropy An of 0.13 leading to a film thickness of 1 $\mu$m for $\lambda/4$ retarder plates. The LCP material is applied onto the LPP layer by spin-coating, but also other printing or coating techniques are applicable.

The orientation (if any) of the LPP layer 141 in the different areas aligns the LCP material 142 (and therewith its optical axes) accordingly, and the LCP layer is then exposed to non-polarised (isotropic) UV light of a suitable wavelength to be cross-linked.

As an example of the inspection device of FIG. 2a, the LPP/LCP layer 24 is applied on a transparent substrate (not depicted in FIG. 2a), such as glass or plastic. It is possible to apply the LPP/LCP layer 24 directly onto the linear polariser 22, but then in general only one observation mode (say positive mode) for third level inspection is possible because when—for reaching the negative mode—rotating the polariser which includes also the patterned LPP/LCP layer the decrypting areas do not fit any longer with the corresponding encrypted areas of the security device and therefore, third level information are then not perceivable. The techniques used are the same as for the optical authentication device. They are disclosed for example in the patent publications listed above and will also be described in more detail.

An orientable linearly photopolymerisable (LPP) layer 241 is spin-coated (other printing or coating techniques are also applicable) onto a transparent substrate. Suitable LPP materials, such as cinnamic acid derivatives or ferulic acid derivatives, are e.g. illustrated in patent publications EP-A-611786, WO 96/10049 and EP-A-763552.

This LPP layer with a thickness of about 50 nm is exposed through a photo mask to polarised UV light of suitable wavelength. By using different polarisation directions, for instance 0° and 45° (0° means parallel to one edge of the substrate), for different areas (pixels) (62), an orientation pattern is created (cf FIG. 6, lower pattern), which is the decoding pattern belonging to the image encrypted in the optical device.

This enables the storage of decoding patterns into the LPP layer. Decoding pattern means a specific LPP—and therefore also LCP—patterning selection with a given orientation of each area (pixel) of the pattern in such a way that when the decoder is superimposed over the encrypted optical device, for each pixel the orientation and retardation of the LCP of the optical device combined with the orientation and retardation of the LCP of the decoder gives a specific optical retardation, which—when seen through a linear polariser— gives a specific grey shade or colour of the encrypted image which finally decodes and visualises the picture information of the security device.

Additionally, a more complex orientation pattern of the structured phase retarder of the inspection device (decoder or key) as well as of the optical device could also be used for encryption and decoding. Other angles of polarisation directions would in particular be easily possible, if an appropriate structured LPP/LCP layer is used instead of a conventional photo masks. Such an LPP/LCP master patterns the incident polarised UV light into areas with different polarisation directions so that a whole pattern of different polarisation directions can be applied in one single step.

If for the exposure of the LPP layer of the decrypting inspection device an LPP/LCP master is applied, the encryption level can be increased considerably with only one exposure step, which means that an increase of the pattern complexity of the structured retarder combined with an easier, faster and cheaper manufacturing process is achieved. The security of such an optical authentication device is then extremely high and can be hardly counterfeited.

As with the optical device, the oriented LPP layer is finally coated with a cross-linkable liquid crystal monomer or pre-polymer mixture (LCP) 242, which shows birefringence, such as the LCP mixture $M_{LCP}$ described in more detail later. The LPP layer is applied by spin-coating, but other printing or coating techniques are also applicable. $M_{LCP}$ has an optical anisotropy An of 0.13 leading to a film thickness of 2 μm for λ/2 retarder plates.

The orientation (if any) of the LPP layer in the different areas aligns the LCP material (and therewith its optical axis) accordingly, and the LCP layer is then exposed to non-polarised (isotropic) UV light of a suitable wavelength to be crosslinked.

FIGS. 4 and 5 show schematically the configuration of the optical authentication device and its working principle.

Without the 3rd level inspection device, a linear polariser 26 is used to visualise the normally hidden image. The normally not polarised light passes through the linear polarizer and is therefore linearly polarised, say 45° to one edge of the optical device (see FIG. 5). Then by passing through the structured retarder 14 of the optical device, with an optical retardation of λ/4, the linear polarised light is converted in left or right handed circularly polarised light within the selective wavelength band depending on the direction of the optical axis of the phase retarder element 60 in relation to the direction of the incident polarised light (see FIG. 5). The cholesteric layer 12 will then reflect the appropriate circularly polarised light within the reflecting wavelength band, e.g. a left handed cholesteric filter will reflect left handed circular polarised light and will transmit right handed polarised light within the reflecting wavelength band—the other wavelengths will pass through the cholesteric filter without any alteration and will finally be absorbed together with the right handed circularly polarised light in the substrate 10. The reflected circularly polarised light will be linearly polarised when passing again through the λ/4 plate 14. This linear polarised light has the same polarisation direction as the entry linear polarizer leading to bright coloured segments or pixels. The segments for which the helical sense of the circularly polarised light has the opposite helical sense such that no reflexion on the cholesteric layer 12 results, are dark or black. Therefore, normally hidden objects and information can be visualised with a linear polarizer posed on top of the optical device. This corresponds to a second level inspection security device. When the linear polarizer is rotated by 90 degrees the appearance changes from positive to negative attitude. In addition, by tilting the optical device a colour shift is observed to shorter wavelengths (e.g. from red to green or from green to blue).

When an additional, appropriately structured λ/2 retarder plate 24 (which represents the decrypter or key) is posed between the linear polariser and the optical device, the normally hidden and encrypted object or information is visualised. This corresponds to a $3^{rd}$ level inspection security device. Again, by rotating the polariser by 90 degrees the image change from the positive to their negative counterparts. Also, by tilting the optical device a colour shift towards shorter wavelengths is observed (e.g. from red to green or from green to blue).

The light propagation through the optical device combined with the superimposed inspection device can be described as follows:

The normal, not polarised light passes through the linear polariser 26 and is therefore linearly polarised. Then, the linearly polarised light passes through the decoder 24, which consists of a structured phase retarder with an optical retardation of λ/2. If the optical axis of a pixel of the decoder is parallel to the polarisation direction of the light, the light remains unchanged. However, if the angle between the direction of the optical axis of the decoder and the direction of the linear polarisation is 45 degrees, a rotation of 90 degrees of the linearly polarised light is observed.

Then, the light passes through the structured λ/4 plate 14 belonging to the security device and becomes—depending on the directions of the optical axis of the λ/4 plate elements 60 related to the polarisation direction of the incident polarised light (plus or minus 45 degrees)—left or right handed circularly polarised. All possible directions and/or helical senses are described in FIG. 5. The left or right handed circularly polarised light will then enter into the cholesteric filter 12. If the cholesteric filter is left handed, within the reflective wavelength band of the cholesteric filter the left handed circularly polarised light will be reflected and the other light will pass through the cholesteric filter and will essentially be absorbed by the background substrate. A left handed cholesteric filter does not show any reflecting properties when right handed circularly polarised light enters into the cholesteric filter, that means that all the light—not only the isotropic (not polarised) light outside the selective wavelength band but also light within the selective reflecting band with the opposite helical sense (to the helical sense of the cholesteric filter)—will pass the cholesteric filter and will essentially be absorbed by the background substrate. Thus, pattern for which the light will be essentially absorbed appear dark or black, and pattern for which circularly polarised light will be reflected appear bright and normally coloured. Analogously, when the cholesteric filter is right handed, the right handed circularly polarised light is reflected within the reflective wavelength band of the cholesteric filter and the other light will be absorbed by the background substrate 10. For the left handed cholesteric filter the reflected left handed circularly polarised coloured light is reflected by the cholesteric filter and will pass again through the same element of the structured λ/4 plate as before and will consequently be transformed into linearly polarised light.

Again, depending on the directions of the optical axis of the decoder 24 (62) (structured λ/2 plate), the linearly polarised light will be rotated or not by 90 degrees. Finally the coloured polarised light will pass the linear polariser sheet 26 if its polarisation direction is parallel to the polarisation direction of the sheet polariser. By that, the corresponding image pattern gets a bright and coloured appearance. On the other hand, if the linearly polarised coloured light is perpendicular to the polarisation direction of the sheet polariser, the corresponding image pattern has a dark appearance.

In addition, depending on the reflective wavelength bandwidth of the cholesteric filter the reflected light can change its colour appearance. The selective reflecting wavelength and its bandwidth can be adjusted such, that colours between red and blue can be selected, for special applications even reflecting bands in the IR or UV can be chosen. By increasing the bandwidth of the cholesteric filter almost over the visible wavelength range it is even possible to create circularly polarised white or whitish light.

Finally, without any additionally inspection tools—i.e. with the naked eye—a colour shift towards shorter wavelengths is observed by tilting the optical device (depending on the selective reflective wavelength of the cholesteric filter e.g. from red to green or from green to blue). This corresponds to $1^{st}$ inspection security level.

FIG. 6 shows schematically the directions of the optical axis of an example of the optical device and of the decrypter. The optical device comprises a rectangular grid array of elemental areas 60, select only optical axis parallel to the edges of the device, in first and second exposures, the first with a photomask, and the second without a mask. The decrypting device comprises a rectangular grid array of elemental areas 62, selectively arranged either parallel to the bottom edge of the device in a first photomask operation, or at 45° thereto in a second exposure operations without mask. Of course, it is possible to use also for the second exposure step an appropriate photo-mask. Again, when a LPP/LCP master is used for the exposure process of the LPP layer with linear polarised light only one exposure step is enough for storing image information into the decrypter or into the optical device, even for very complex arrangements—including multiple directions of the optical axis (two or more). Regarding the pixel arrangement, it is possible to use not only a regular rectangular arrangement but also every kind of regular or irregular pixel sizes, shapes and arrangements such as e.g. rhombic, triangle, hexagonal or randomly organised arrangements, etc. Very complex pixel arrangements can be made preferably by digital picture generation with appropriate software.

FIG. 7 shows schematically the masks used for the present optical device and for the decoder.

It is also possible to use other types of hidden optical LPP/LCP devices, such as non-cholesteric LPP/LCP devices, picture in picture configured LPP/LCP devices etc. Such devices are described e.g. in patent applications EP-A-0 689 084, EP-A-0 689 065, WO 98/52077, WO 00/29878 and WO 00/57356. One such alternative device is described below.

One alternative embodiment would be a reflective $2^{nd}$ and $3^{rd}$ level inspection LPP/LCP security device. In this case, the device could consist of a patterned encrypted λ/4 plate on a metallic reflector. Possible alignment directions are e.g. 0 or 45 degrees. The inspection tool for $2^{nd}$ level inspection is a linear polariser. For $3^{rd}$ level inspection, the inspection tool could be made e.g. from one or two superimposed structured λ/4 plate(s) (alignments: e.g. 0, −45 or 90 degrees) according to the encryption pattern of the optical device, or, more preferably, one superimposed λ/4 plate (alignments: 0 and 67.5 or 112.5 degrees), placed between the optical device and the linear polariser.

The further embodiment of FIG. 3 can be used also as a transmissive optical device. For instance, the example given above using a cholesteric LPP/LCP optical device with a corresponding LPP/LCP decoder also works in transmissive mode.

Furthermore, pure non-cholesteric LPP/LCP configurations can be used as encoded optical devices and also as corresponding LPP/LCP decrypter.

A different embodiment of the decrypter—instead of λ/4 plate plus linear polariser—would be a structured linear polariser, preferably made with dichroic dyes in the LCP layer. However, the contrast ratio of such an inspection tool is not as high as the combination of a relatively cheap commercial available linear sheet polariser and a corresponding decoding structured phase retarder LPP/LCP plate as described above.

Furthermore, the preferably used decrypter (combination of optical phase retarder and linear polariser) has an additional feature: by rotating the mono-axial linear polariser over the optical device with superimposed structured LPP/LCP decoder the optical appearance changes alternatively from 'positive' to its 'negative'.

The production of a LPP, LCP and cholesteric LCP layer which can be used according to the invention will be described, in more detail below, still by way of example.

1. Production of an LPP Layer 141

Suitable LPP materials are described for instance in patent publications EP-A-611786, WO 96/10049 and EP-A-763552, and include cinnamic acid derivatives and ferulic acid derivatives. For the foregoing Examples, the following LPP material was chosen:

Polymer:

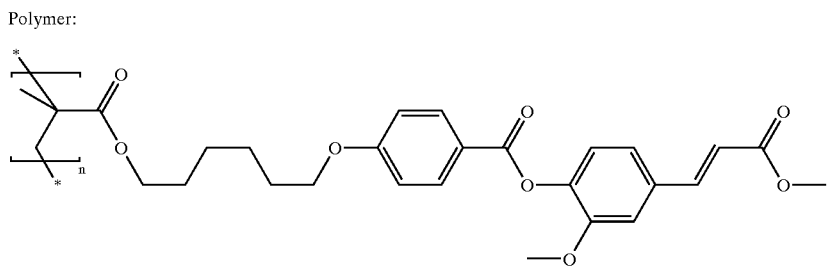

A 2 percent strength solution of the LPP material in MPK (methyl propyl ketone) was spin-coated for one minute at 2000 rpm. The layer was then dried for 5 to 10 minutes at 130° C. on a hotplate. The layer was then exposed to linearly polarised light from a mercury high-pressure lamp for 10 to 550 seconds (depending on the strength of the lamp and on the characteristics of LPP and LCP layers of the optical device) at room temperature. The layer was then used as an orientation layer for a liquid crystal material.

2. Mixture $M_{LCP}$ of Cross-Linkable Liquid Crystal Monomers for the LCP Layer 142

In the examples, the following diacrylate components were used as cross-linkable liquid crystal monomers:

Mon1

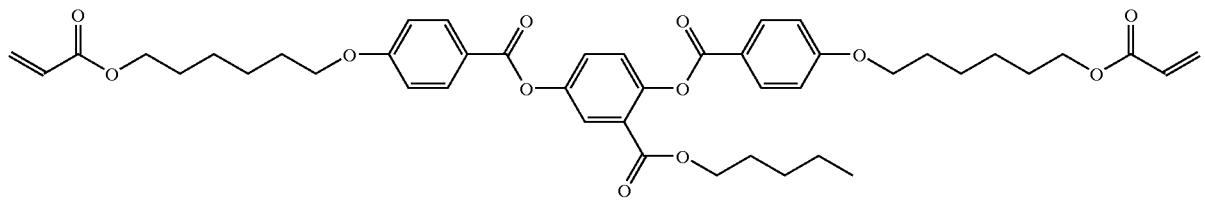

Mon2

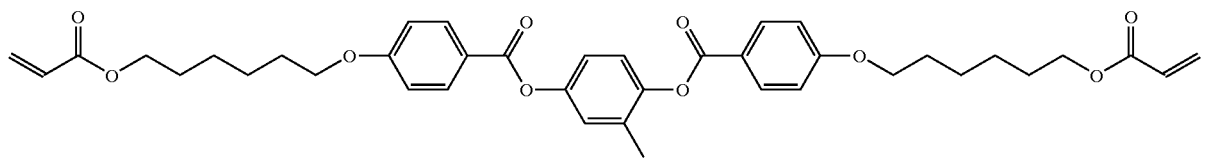

Mon3

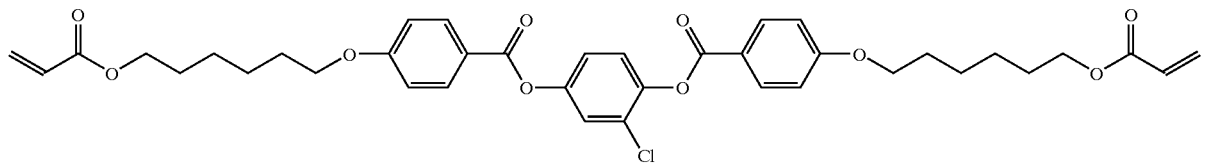

Using these components, a supercoolable nematic mixture MLCP with particularly low melting point (Tm~35° C.) was developed, making it possible to prepare the LCP layer at room temperature. The diacrylate monomers were present with the following composition in the mixture:

Mon1 80%
Mon2 15%
Mon3 5%

In addition a further 2% of the Ciba-Geigy photoinitiator IRGACURE (trade mark) was added to the mixture.

The mixture $M_{LCP}$ was then dissolved in anisole. By means of varying the $M_{LCP}$ concentration in anisole, it was possible to adjust the LCP layer thickness over a wide range. Especially for the examples of optical devices described herein, desired retardations And of 0.13 to 0.14 μm could be achieved. To optimise the brightness, the retardation should be adapted to the reflecting wavelength band of the cholesteric layer.

For photoinitiated cross-linking of the LC monomers, the layers were exposed to isotropic light from a xenon lamp for about 1 to 30 minutes (depending on the strength of the lamp) in an inert atmosphere.

3. Cholesteric LCP Layer 12

For making the cholesteric LCP layer, a procedure similar to that of the nematic LCP layer was used. However, the mixture $M_{LCP}$ was additionally doped with cholesteric material inducing a pitch. A suitable chiral dopant was e.g. ST31L, which shows a left-handed helical sense.

ST31L:

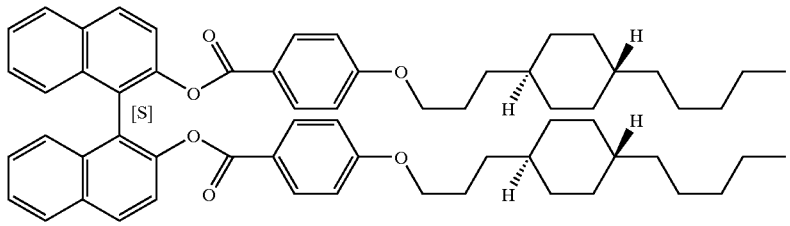

The concentration of the chiral dopant was for ST31L about 4% to 9%, more preferably 5 to 6%. This induces the desired reflective wavelength band in the visible range, but by changing the concentration also reflective wavelength bands in the UV or IR range can be realised. The substrate was coated with that cholesteric material by spin coating. The spin parameter are similar to those applied above. Of course also other printing or coating techniques can be applied, e.g. slot-coating, kbar-coating, etc.

The thickness of the cholesteric layer is 1 to 10 microns, depending on the wavelength range, more preferable from about 2 to 8 microns. Anisole is used as solvent. After the drying process on a hot plate (see above) the cholesteric LCP material containing a photo-initiator is cross-linked with isotropic UV light from a xenon lamp for about 1 to 30 minutes (depending on the strength of the lamp) in an inert atmosphere.

The optical effects described above, as well as the corresponding layer structures and material compositions, represent only some of many possibilities according to the invention, and may in particular be combined in a wide variety of ways in order to develop authenticating elements.

Thus, it is of course possible for any other kind of birefringent layer than the LCP layer described to be used to produce an optical effect that can be employed in optical devices, for example for authentication elements.

It is furthermore possible for the examples described above, to use not an LPP orientation layer but a different orientation layer which, according to the desired optical property and resolution, has the same or similar properties to an LPP layer. It is also conceivable to produce the orientation required for a retarder layer using a correspondingly structured substrate. A structured substrate of this type can, for example, be produced by embossing, etching and scratching.

The present invention has applications in many fields, e.g.:

document security, passports, identification cards to increase security and handling in the field of brand protection security packaging (pharmaceuticals, liquors, wines, flavours, software, food, . . . )

banknote, stamps, checks, shares aircraft and car parts.

What is claimed is:

1. An optical authentication device in combination with an inspection tool, wherein the authentication device comprises at least a first layer of optically anisotropic material which is selectively oriented in different orientations over its area such as to encrypt an object therein; and wherein the inspection tool includes a further layer of optically anisotropic material which is selectively oriented in different orientations over its area for decrypting the object such that the object can be viewed when the authentication device is viewed through the inspection tool.

2. An optical authentication device in combination with an inspection tool, wherein the authentication device comprises at least a first layer of optically anisotropic material which is selectively oriented in different orientations over its area such as to encrypt an object therein; and wherein the inspection tool is adapted to provide a light path or light beam having an optical parameter that is non-uniform over its width such as to cooperate with said optical ansiotropic material to enable viewing of the encrypted object.

3. A device according to claim 1, wherein the first layer of optically anisotropic material is structured to provide first, second and third optical inspection levels, including a first inspection level where an optical effect can be discerned with the naked eye, a second level in which a disguised object can be discerned with the aid of a polarizer and a third level in which said encrypted object can be discerned with said decrypting optical inspection tool.

4. A device according to claims 1, 2 or 3, wherein the first layer is divided into an array of elemental areas, each elemental area having a predetermined orientation.

5. A device according to claims 1, 2 or 3, wherein said first layer is formed of an optical phase retarder material.

6. A device according to claim 5, wherein said first layer comprises birefringent liquid crystal material (LCP) that includes a monomer or pre-polymer.

7. A device according to claim 6, wherein the LCP material has its selective orientation fixed, having been exposed to a source of energy.

8. A device according to claim 7, further including a layer of linearly photopolymerisable material (LPP) exhibiting selective orientation for aligning the LCP material.

9. A device according to claim 8, wherein the LPP material has been exposed to polarised light through photomask means to define an array of a multiplicity of elemental areas, each having a predetermined orientation.

10. A device according to claim 7, further comprising a substrate with a surface configuration for defining the orientation of the LCP material.

11. A device according to claims 1, 2 or 3, further including a second layer comprising cholesteric material of helical left- or right-handed material for reflecting light with an appropriate circular polarisation.

12. A device according to claim 11, wherein the cholesteric material is a cholesteric liquid crystal (cholesteric LCP) and forms a cholesteric LCP layer.

13. A device according to claim 12, wherein the cholesteric LCP material is cross-linked, having been exposed to a source of energy.

14. A device according to claims 1, 2 or 3, further including a second layer for reflecting light over a predetermined range of wavelengths.

15. A device according to claims 1, 2 or 3, further including a substrate mounting said first layer.

16. A device according to claim 1, wherein said further layer is formed of an optical phase retarder material.

17. A device according to claim 1, wherein said further layer is divided into an array of elemental areas, each elemental area having a predetermined orientation.

18. A device according to claim 1, wherein said further layer comprises birefringent liquid crystal material (LCP) that includes a monomer or pre-polymer.

19. A device according to claim 18, wherein the LCP material has its selective orientation fixed, having been exposed to a source of energy.

20. A device according to claim 19, further including a layer of linearly photopolymerisable material (LPP) exhibiting selective orientation for aligning the LCP material.

21. A device according to claim 20, wherein the LPP material has been exposed to polarised light through photomask means to define an array of elemental areas, each elemental area having a predetermined orientation.

22. A device according to claim 19, wherein a substrate of the decrypting tool has a surface configuration for defining the orientation of the LCP material.

* * * * *